P. FLOOD.
TROLLEY FORK.
APPLICATION FILED DEC. 27, 1916.
1,247,947.
Patented Nov. 27, 1917.
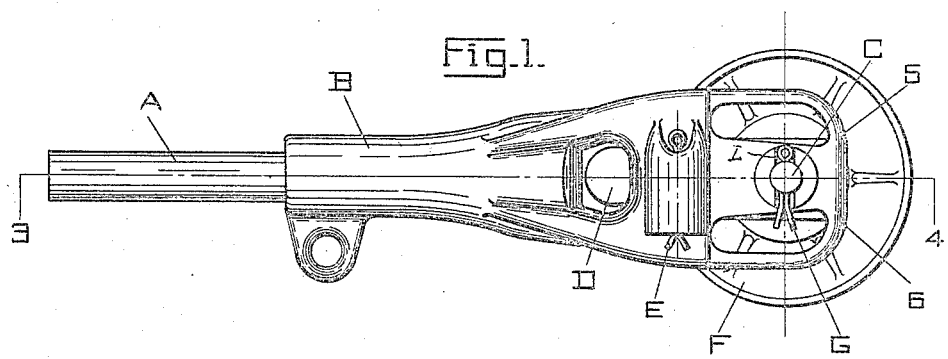
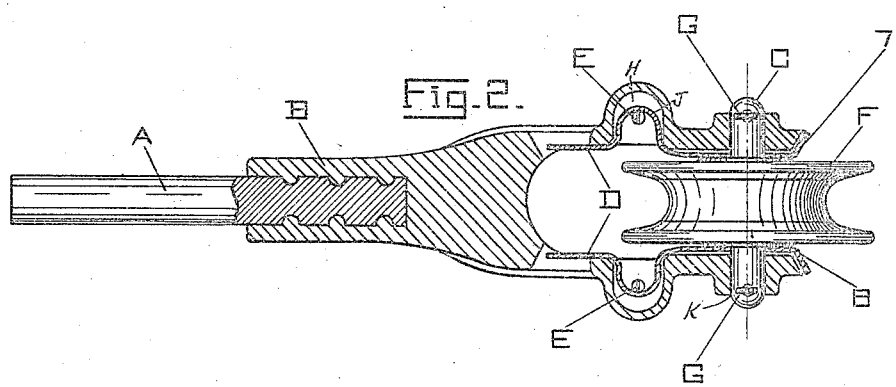
Inventor
Patrick Flood,
by Frederick W. Cameron,
Atty

UNITED STATES PATENT OFFICE.

PATRICK FLOOD, OF ALBANY, NEW YORK, ASSIGNOR OF ONE-HALF TO EDWARD J. B. MURRAY, OF ALBANY, NEW YORK.

TROLLEY-FORK.

1,247,947. Specification of Letters Patent. Patented Nov. 27, 1917.

Application filed December 27, 1916. Serial No. 139,170.

*To all whom it may concern:*

Be it known that I, PATRICK FLOOD, a citizen of the United States of America, residing at the city of Albany, in the county of Albany and State of New York, have invented certain new and useful Improvements in Trolley-Forks, of which the following is a specification.

My invention relates to trolley forks, and the object of my invention is to provide a contact for a trolley wheel, which will be convenient in its use and positive in its application; together with such other elements and combinations as are hereinafter more particularly set forth.

I accomplish these objects by means of the mechanism illustrated in the accompanying drawing, in which:

Figure 1 is a side elevation.

Fig. 2 is a section along the line, 3—4, on Fig. 1.

Similar letters refer to similar parts throughout the several views.

The trolley arm, A, is attached to the trolley fork, B, within which the trolley wheel, F, is held by the pin, C. The cotter pins, G, G, hold the pin, C, in position in the fork. The spring plate, D, is bent upon itself, forming a loop-shaped portion resting upon the rivet or bolt, E, within a suitable recess, H, in the trolley fork. The recess, H, is of sufficient depth to allow for a movement of the loop, J, therein. The spring plate, D, rests against the side of the wheel, F, making contact therewith. I place the wheel between the spring plates which, upon each side of the fork, are thus in electrical engagement with each side of the wheel, and the pin, C, passes through each of the plates as well as through the wheel. When the wheel is removed the plates are not forced toward each other by their resiliency to such an extent as to make the insertion of the wheel between them a difficult and time-consuming job, on the contrary, the plates, because of the loop being between the fulcrum and place of engagement of the side of the plate with the wheel, there being space in the recess, H, to push the loop therein, the operative or loose ends of the plates are easily and quickly separated for the insertion of the trolley wheel between them.

The arrangement of the plates so that the wheel may be thus readily inserted is one of the features of my invention, because, as heretofore usually constructed, so far as I am aware, the plates have been secured at their ends and arranged to spring together at their opposite ends, and when the wheel is removed these ends have to be separated and held apart in order to insert the wheel in place between them. It is very difficult to do this, especially when on the top of a car in a cold rain.

By making the plates in the manner described with the heel of the plate loosely extending against the sides of the tines of the fork, the fork may be cut out so that different sized wheels may be inserted, if desired. This would be quite impossible when the kind of plates hereinbefore referred to are used.

The arrangement of the cotter pins so that when the one on one side of the fork is in alinement with the slot, K, it will indicate that the hole in the bolt for the insertion of the cotter pin is in alinement with a like slot, L, on the opposite side of the fork, is a great convenience and adds to the rapidity of fitting a trolley wheel in position and therefore curtails the delay of the car.

What I claim as my invention and desire to secure by Letters Patent is:

1. In a trolley fork, a trolley wheel; two like spring plates loosely mounted within the fork adapted to engage the opposite sides of the wheel, each plate bent between its ends to form a loop-shaped offset, one end of the plate resting against the side of the fork and the loop-shaped offset inserted within a correspondingly formed though deeper recess in the fork, the other end of the plate adapted to engage the wheel; and means for retaining the offset within the recess.

2. In a trolley fork a trolley wheel; a spring plate loosely mounted in the fork having one end resting against the side of the fork, said plate having formed in it a loop-shaped offset inserted into a correspondingly formed though deeper recess in the side of the fork; means for preventing said loop-offset from falling out of the recess; a pin provided with holes for cotter pins near each end adapted to be inserted through the fork, the wheel and said plate;

cotter pins adapted to be inserted through the holes in said pin; and retaining means on the side of the fork for preventing the cotter pins from rotating, said retaining means so located in reference to the holes through the pin that when a cotter pin is inserted and placed in position on one side of the fork, the hole in the pin on the other side of the fork is in alinement with the retaining means on that side.

In testimony whereof I have affixed my signature in the presence of two witnesses.

PATRICK FLOOD.

Witnesses:
FREDERICK W. CAMERON,
BEULAH CARLE.

Copies of this patent may be obtained for five cents each, by addressing the "Commissioner of Patents, Washington, D. C."